Feb. 16, 1960     G. A. THOMAS     2,925,133
AUXILIARY STEERING MECHANISM FOR VEHICLES
Filed July 14, 1958     7 Sheets-Sheet 1
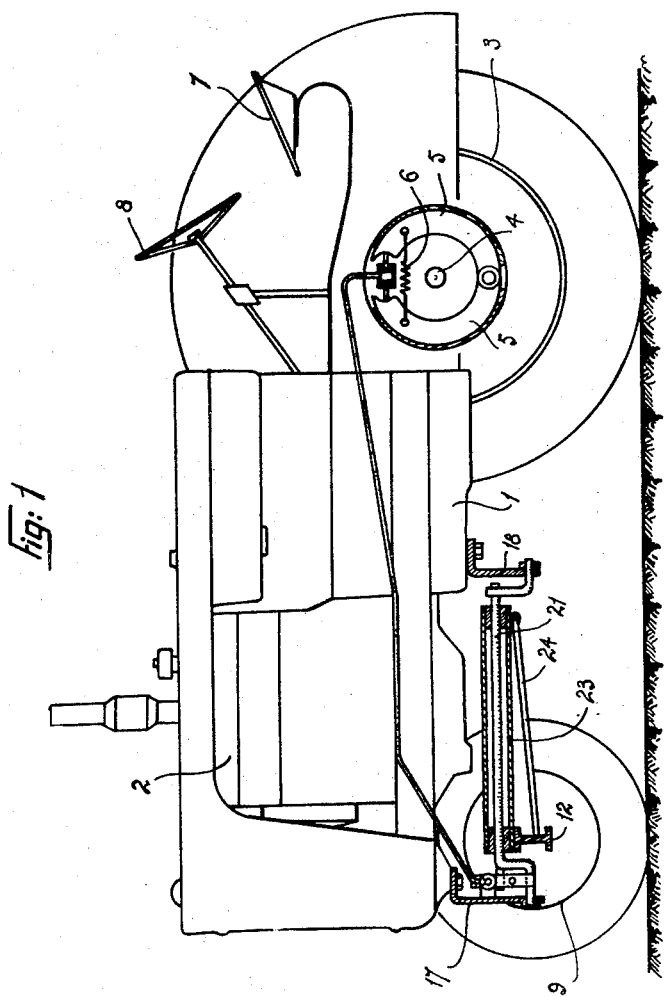
INVENTOR
GEORGES A. THOMAS
BY Irwin S. Thompson
ATTY.

Feb. 16, 1960   G. A. THOMAS   2,925,133
AUXILIARY STEERING MECHANISM FOR VEHICLES
Filed July 14, 1958   7 Sheets-Sheet 2

INVENTOR
GEORGES A. THOMAS
By Irwin S. Thompson
ATTY.

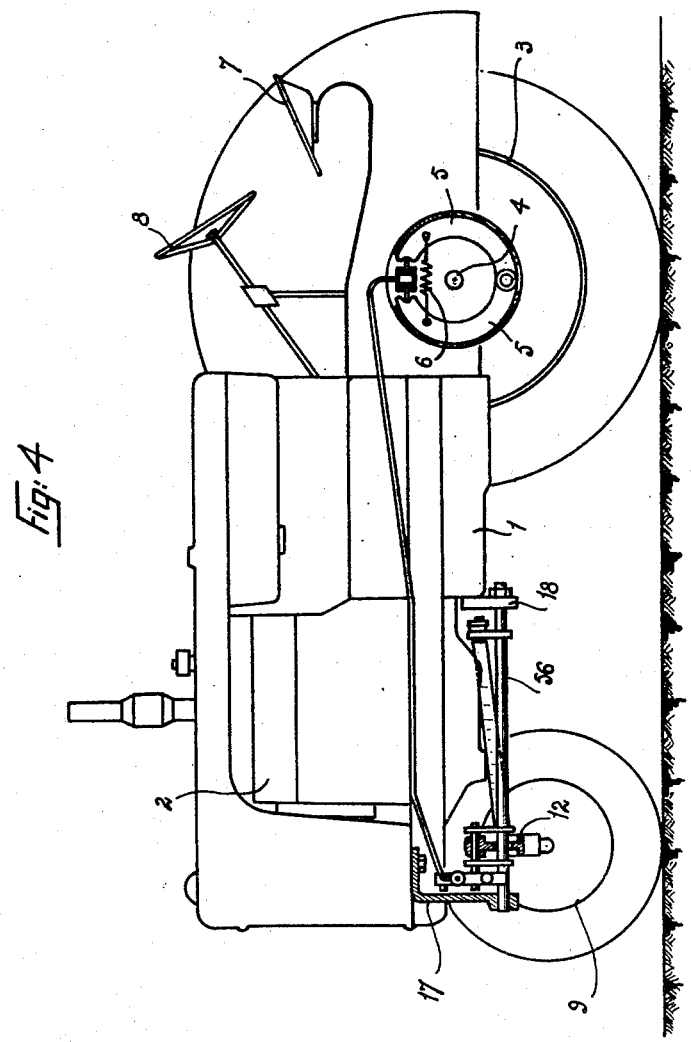

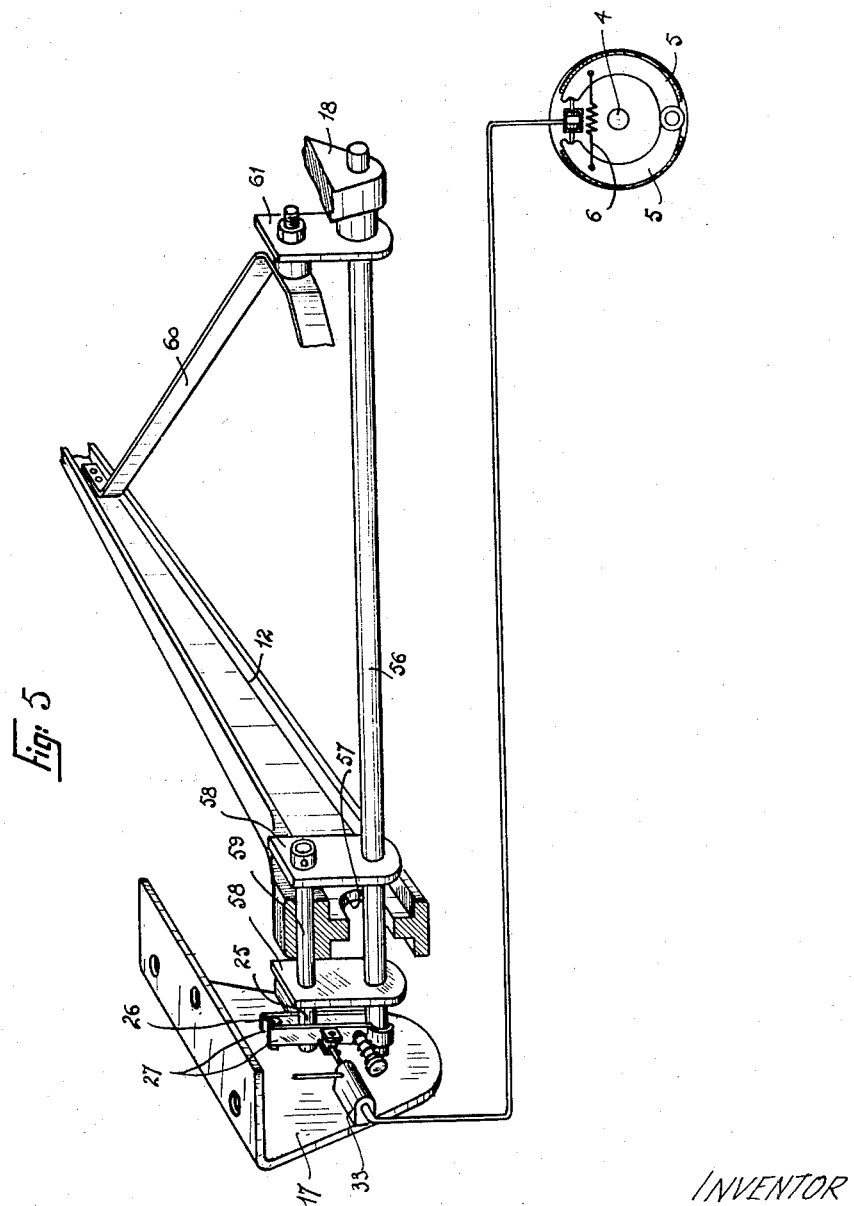

Feb. 16, 1960 G. A. THOMAS 2,925,133
AUXILIARY STEERING MECHANISM FOR VEHICLES
Filed July 14, 1958 7 Sheets-Sheet 5
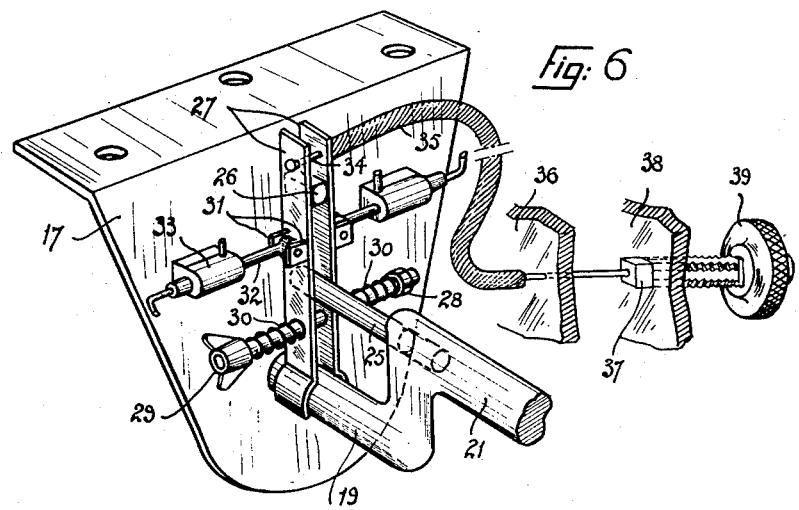
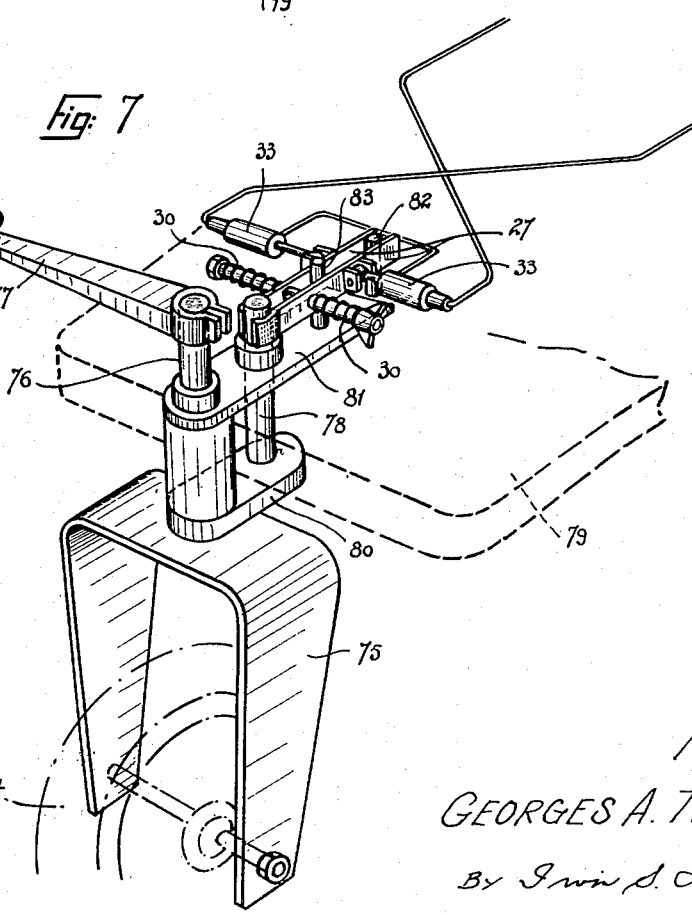
INVENTOR
GEORGES A. THOMAS
By Irwin S. Thompson
ATTY.

Feb. 16, 1960 G. A. THOMAS 2,925,133
AUXILIARY STEERING MECHANISM FOR VEHICLES
Filed July 14, 1958 7 Sheets-Sheet 6

INVENTOR
GEORGES A. THOMAS
By Irwin S. Thompson
ATTY.

Feb. 16, 1960  G. A. THOMAS  2,925,133
AUXILIARY STEERING MECHANISM FOR VEHICLES
Filed July 14, 1958  7 Sheets-Sheet 7
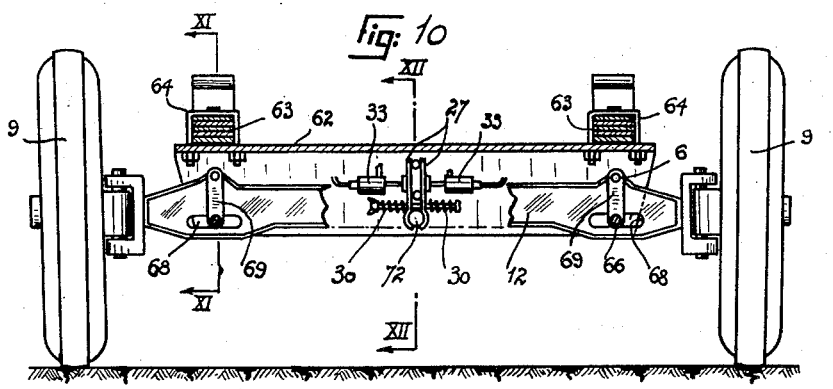
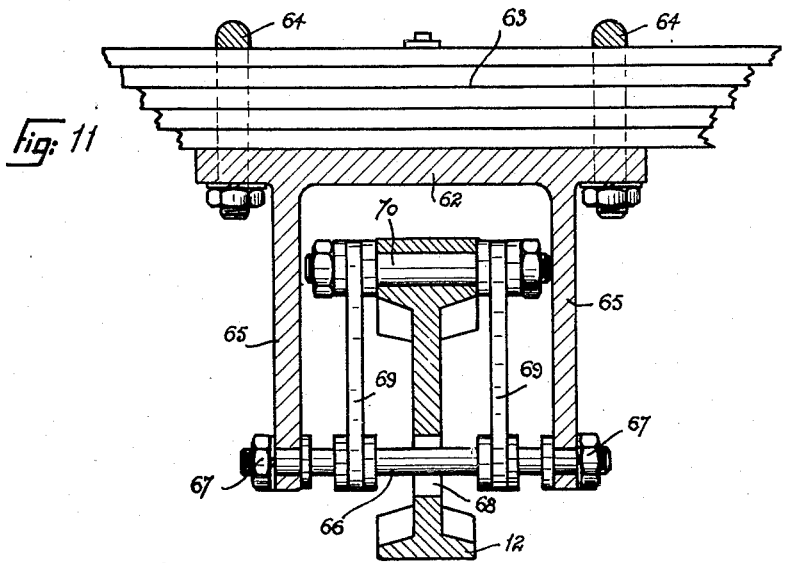
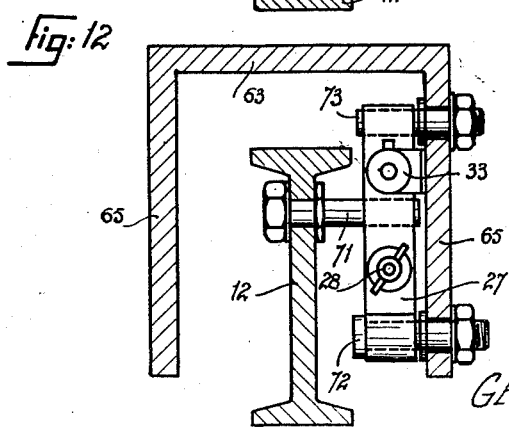
INVENTOR
GEORGES A. THOMAS
BY Irwin S. Thompson
ATTY.

2,925,133

AUXILIARY STEERING MECHANISM FOR VEHICLES

Georges A. Thomas, Paris, France

Application July 14, 1958, Serial No. 748,216

Claims priority, application France July 17, 1957

13 Claims. (Cl. 180—6.26)

The present invention has for its object a steering mechanism for terrestrial self-propelling vehicles, whose driving wheels are controlled through the agency of a differential, and more particularly for vehicles used on loose ground, such as tractors for agricultural purposes or public works.

One feature of the invention is to secure the deflection of such vehicles, even light, in the difficult loose ground.

The steering mechanism according to the invention automatically cooperates with brakes acting on driving wheels, without personal action of the driver. The braking action depends not on the amplitude of the deflection of the steering wheels, but on the reaction of the ground on the wheels during the deflection.

In the steering mechanism according to the invention, the steering wheels are mounted on a piece which is free to move transversely with reference to the chassis, while a control member for each of the special brakes provided for the driving wheels is subjected to the action of the lateral shifting of last-mentioned member. Thus, when the vehicle is to initiate a curve through an angular shifting of the steering wheels, the transverse reaction exerted by the ground on the deflected wheels produces a translational movement towards the inside of the turn of the axle or the like member carrying said wheels, and said axle acting on the brake for the inner driving wheel, produces a braking of said wheel which is proportional to said transverse reaction and consequently, to the deflection, which has for its result to make the driving wheels cooperate with the steering of the vehicle as a whole. In other words, the differential braking of the driving wheels is controlled by the transverse location of the axle carrying the steering wheels and adapted to move transversely.

The advantage of my improved mechanism consists in that it ensures accurate changes in direction under all circumstances. The driving energy during such modifications in steering serves solely for the propulsion of the vehicle. Furthermore, when designing a tractor, it is possible, taking into account the fact that any reduction due to the nose-lifting torque or to the rearward shifting of the center of gravity when the tractor moves over a gradient, to limit the adherent weight of the steering wheels to the value required for controlling the brakes. The main portion of the tractor weight may therefore serve as an adherent weight for the driving wheels; for an equal value of said adherent weight, a tractor provided with my improved auxiliary mechanism may be lighter than a tractor of a conventional structure and this leads to a reduction in the energy consumed and to an increase in yield.

The characteristic features of my invention will appear however more completely from the following description of various embodiments of my improved mechanism, reference being made to the accompanying diagrammatic drawings illustrating same by way of example. In said drawings:

Fig. 1 is a view from the left-hand side, after removal of the left-hand wheels, of a tractor incorporating a first embodiment of my ancillary steering mechanism illustrated partly in cross-section.

Fig. 4 is a view similar to Fig. 1 of a tractor provided with a mechanism according to a second embodiment of my invention.

Fig. 5 is a half-perspective view of said mechanism.

Fig. 6 is a detail perspective view of the brake controlling means.

Fig. 7 is a perspective view of my improved mechanism applied to a single steering wheel.

Fig. 10 is a front elevational view of a suspended axle provided with my improved ancillary mechanism, the front flange of a cross-member carrying the axle being removed.

Fig. 11 is a transverse cross-sectional view of Fig. 10 through line XI—XI of said Fig. 10.

Fig. 12 is a further transverse cross-sectional view through line XII—XII of Fig. 10.

Figure 3:
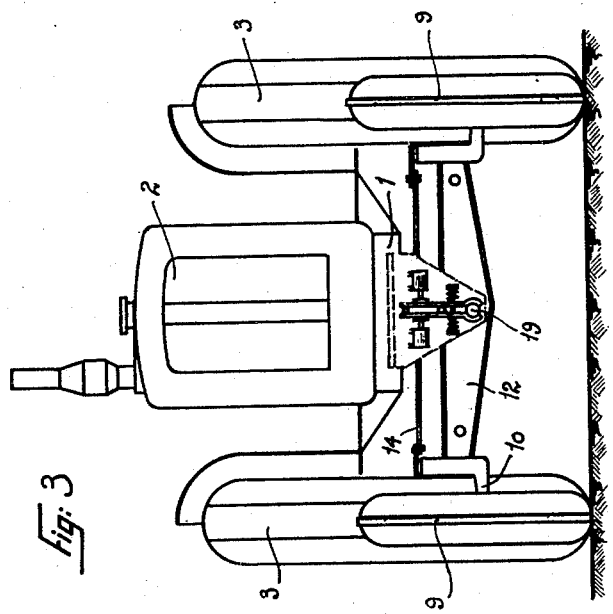
Fig. 3 is a front view of the tractor illustrated in Fig. 1, after removal of a front fixture.

My invention is applicable to any self-propelling vehicle adapted to move overground and the driving wheels of which are controlled by a differential, while the steering is performed through a deflection of angularly shiftable wheels and, consequently, I will describe hereinafter my improved ancillary mechanism, while assuming, for sake of clarity, that it is fitted to an agricultural tractor of such a type of vehicle. As illustrated in Figs. 1 and 3, 1 designates the chassis, 2 the power unit, 3 the driving wheels carried by a rear axle 4 provided with a differential which is not illustrated. Each driving wheel is provided individually with a brake including a drum and of which only the shoes 5 are illustrated, with their return spring 6. Above the rear axle is provided the seat 7 of the driver facing the driver's wheel 8 and the usual driving controlling means which are not illustrated.

Figure 2:
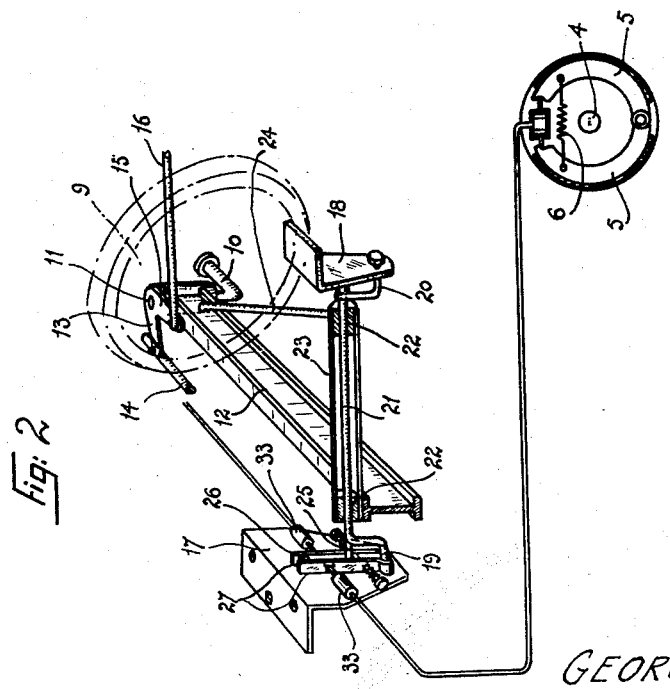
Fig. 2 is a half perspective view of said mechanism.

The front wheel 9 forms steering wheels, as shown also in Fig. 2. The stub axle 10 for each of the wheels is angularly shiftable according to conventional structures round the axis of a pivot 11 provided at the corresponding end of the front axle 12. The two pivots 11 carry each a horizontal lever, the parallel arms 13 of which are interconnected by a coupling bar 14, pivotally secured thereto. One of the said levers includes a second arm 15 extending transversely and to which is pivotally secured the steering rod 16.

According to my invention, the axle 12 of the steering wheels, instead of being fitted simply or in an oscillating manner with reference to the chassis, is adapted to move transversely through the following means. Between two fixtures 17 and 18 bolted to the underside of the chassis along the axis of symmetry of the latter, respectively to the front and slightly to the front of said axle and in parallelism and at a larger distance to the rear of said axle, is housed a longitudinal crank-shaft revolving in said fixtures through its terminal trunnions 19 and 20, the common axis of which lies thus in vertical registry with the longitudinal axis of symmetry of the chassis. The elongated crank section of the crank-shaft 21 carries terminal bearings 22 over which is fitted a tube 23 coaxially surrounding said crank section and the front end of which is secured to the middle of the axle 12, while its rear end is connected with each end of said axle through a corresponding staying bar 24. It is thus apparent that the axle 12 which is rigid with the tube 23 is free to rock transversely round the crank section 21 and that its transverse location depends on the angular setting of the latter round the common axis of the trunnions 19 and 20 which are rigid with the chassis.

In the position illustrated in Fig. 2, the crank section 21 registers vertically with the said trunnion axis so that the axle 12 and the wheels 9 carried by the latter assume positions which are symmetrical with reference to the longitudinal vertical plane of symmetry passing through the middle of the chassis. Said position of the crank 21 is a stable position and the fraction of the weight of the chassis carried by the front wheels has a tendency to urge the trunnions 19 and 20 into their lowermost position with reference to the carrier axle. This is, in fact, the case when the tractor is at a standstill or progresses along a straight line over a smooth ground. In contradistinction if, with a view to initiating a turn, the front wheels are deflected, while the tractor is progressing, the deflected wheels are subjected by the ground to a reaction directed towards the center of curvature, i.e. to a transverse effort which urges the axle towards the side of the tractor facing the inside of the curve which has just been initiated. Now, if no mechanical means oppose the inward shifting, as would be the case for the arrangement described hitherto, a member rigid with the axle may, as a consequence of this shifting, act on the means controlling the brake for the rear driving wheel which is located on the inside of the turn so as to produce a braking of said wheel, which braking cooperates with the deflection and makes the tractor turn in the direction controlled by the deflection of the steering wheels. This free transverse shifting afforded for the axle carrying the steering wheels and the selective control of the rear wheel brake ensured through the transverse shifting of the axle form the gist of the invention.

In the embodiment illustrated in Figs. 1 to 3, which is now being described, the arrangement controlling the brakes through a transverse shifting of the axle carrying the steering wheels is associated with means stabilizing elastically said axle in its mean position of equilibrium for rectilinear progression of the vehicle. The brake controlling member transmitting to the brakes the transverse movements of the axle carrying the steering wheels is constituted by a projection 25 forming an extension, for instance, of the crank section 21 of the crankshaft towards the front (see also Fig. 6). Said projection 25 lies thus in vertical registry with the trunnion 19 when inoperative. The fixture 17 carries also, in vertical registry with the trunnion 19 and above the location of the projection 25, an abutment pin 26. These three parts, the stationary pin 26, the movable projection 25 and the trunnion 19 having a stationary axis are housed between two vertical flat arms 27 arranged symmetrically and engaging the trunnion 19 through semi-cylindrical incurved sections so that they may rock round the axis of said trunnion. Said arms are urged elastically towards each other and against the projection 25 and the abutment pin 26. To this end, the flat arms 27 carry a bolt 28 extending freely through them and threadedly engaging a winged nut 29, while two springs 30 surround said bolt on the outside of the corresponding arms 27 so as to bear each through its outer end against the head of the bolt and against the nut according to the case and to urge inwardly and towards each other the two arms 27. Each of the latter carries on its outer surface two lugs 31 between which is pivotally secured the rod 32 of the piston of a corresponding master cylinder 33 of conventional hydraulic control means actuating the brake cooperating with the rear wheel located on the same side of the vehicle, said rods 32 being thus adapted to rock round axes parallel with the trunnion axis.

The axle is thus held in a stable manner by its projection 25 in its mean inoperative position for which the two arms 27 are urged against the abutment pin 26. When the front steering wheels initiate a turn, the axle moves towards the inside of the curve which has been thus initiated and its projection 25 shifts the arm 27 lying on the inside of the curve, whereby it acts on the brake of the rear driving wheel located on the same side. The stress to be overcome by the projection 25 corresponds to the reaction of the spring 30 increased by the reaction of the hydraulic control means. These two reactions increase with the amplitude of movement of the axle, which amplitude depends in its turn on the transverse reaction exerted by the ground on the deflected wheels, and therefore on the steering angle and on the resistant forces opposing the turning of the vehicle. The braking will be all the more intense when said factors are more important and chiefly when the radius of the turn which has been initiated is smaller.

In order that the ancillary steering mechanism may operate, it is sufficient for the adherence of the steering wheels to allow the value of the transverse reaction of the ground on the deflected wheels to be in all cases higher than that of the associated resistance of the spring 30 and of the hydraulic control means. The tensioning of the springs 30 is adjustable and the force required for actuating the hydraulic control means is small. It is therefore sufficient to provide a reduced adherent weight so as to obtain reliably a proper operation of the ancillary steering mechanism under all circumstances. In contradistinction with the operation of an ordinary tractor, the steering wheels do not assume alone the steering of the tractor and the part played by them consists in releasing the auxiliary action of one of the brakes associated with the corresponding driving wheels as a consequence of the transverse movement given by said steering wheels to their axle. The transverse reaction of the ground on the deflected steering wheels cannot lead to an exaggerated shifting of said axle and to a too intense braking of the inner driving wheel since the acceleration of the outer driving wheel produces an immediate compensation of this shifting through a progression of the chassis.

The stabilization of the axle of the steering wheels avoids any untimely action of the brakes before the steering wheels have been deflected. The ancillary steering mechanism has therefore only an auxiliary part to play and there may be cases where its operation is not required; a locking of the axle of the steering wheels in its medial position sets then said mechanism in a permanent inoperative condition and the angular setting of the steering wheels controls alone the changes of direction.

In order to ensure said locking of the mechanism, it is sufficient to provide any locking means for instance that constituted by the locking engagement of the two flat arms 27 against their stationary abutment 26. Fig. 6 shows such locking means wherein a cable 34 passing through one of said arms is attached to the other whereas its sheath 35 abuts against the former. Said sheathed cable leads to the switch-board and its sheath abuts against the stationary wall 36, while the actual cable extending beyond said wall is secured to the end of a square rod 37 sliding inside a square opening in a second stationary wall 38. Said rod is provided with threads along its ridges and carries a knurled nut 39. When the nut 31 is at a distance from the wall 38, the square rod may freely slide inside said wall 38. The cable is therefore free and so is the arm 27 and the steering mechanism may operate. It is sufficient to screw down the nut 39 into engagement with the wall 38 with a view to drawing out the cable into a position locking the arms 27 through engagement with the stop 26. The axle of the steering wheels is then held fast in its mean position and the steering mechanism cannot operate.

Figure 8:
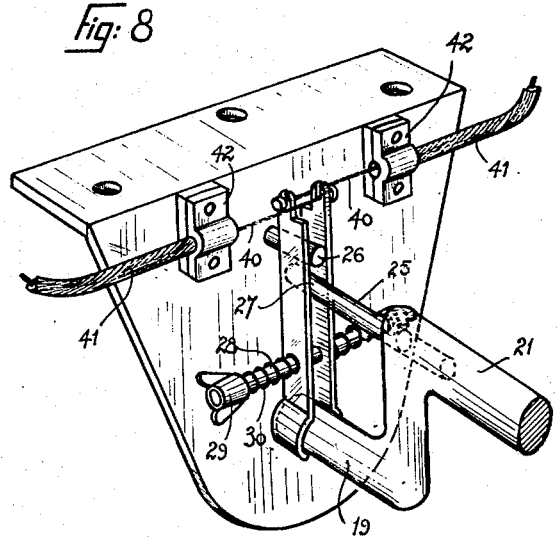
Figs. 8 and 9 are a detail perspective view and an elevational view showing respectively two modifications of brake controlling means, differing from that illustrated in Fig. 6.

Instead of actuating a hydraulic control system for operation of the brakes provided on the two driving wheels, the ancillary steering mechanism may act on said brakes through a tractional stress exerted on two cables 40 provided each with a sheath 41 as illustrated in Fig. 8. In such a case, since the flat arms 27 are to exert a tractional effect instead of a thrust, the cables 40 cross each other and each of them has its sheath 41 fitted inside a block 42 secured to the fixture 17 on the side opposed to the corresponding arm 27 to which the actual cable is attached. Said cable is connected with the brake cooperating with the driving wheel located on the side carrying the corresponding arm 27. The operation of the mechanism is similar to that of the mechanisms described precedingly. A steering of the steering wheels produces a lateral shifting of their axle towards the inside of the curve which the vehicle is about to enter and the projection 25 pushes in the same direction the arm 27 located also on the inside and this draws the cable 40 controlling the brake cooperating with the driving wheel located on the inside.

Figure 9:
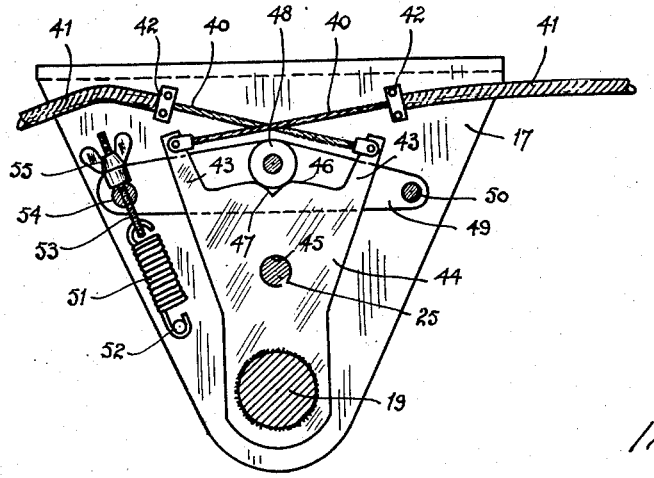

In the modification illustrated in Fig. 9, the crossed cables 40 are attached to divergent extensions 43 of a suitably recessed transversely positioned plate 44 welded to the trunnion 19 of the crankshaft carrying the axle of the steering wheels. The projection 25 on the crankshaft extends through a perforation 45 of said plate so as to ensure its drive in unison with the rocking movements of the crank section of the crankshaft. Between the extensions 43, the transverse plate 44 is recessed and its outline 46 operates as a cam. In the case illustrated in Fig. 9, said outline 46 is constituted by the arc of a circle coaxial with the trunnion 19, except for its medial section forming a re-entrant heart point at 47. Said cam outline is engaged by a roller 48 carried by a lever 49 pivotally secured at one end to a stationary pivot 50 and subjected through its other end to the traction exerted by a spring 51 engaging a stud 52 on the fixture 17. Said spring engages through its other end a threaded rod 53 passing freely through a stud 54 carried by the lever 49 and carrying a winged nut 55 bearing against the stud, whereby the tensioning of the spring may be adjusted. The traction exerted by said spring urges the roller 48 into engagement with the lower point in the middle of the cam outline forming a reentrant section 47 in the shape of a heart point, whereby the plate 44 is stabilized elastically in a position corresponding to the mean position of the steering wheel axle. When the axle is shifted transversely after overcoming first the stress exerted by the spring 51, the roller 48 runs over the cam outline 46 and if the latter is in the shape of an arc of a circle coaxial with the trunnion 19 as already mentioned, the roller may be shifted over said outline without any further modification in the tensioning of the spring 51. Consequently, the only stress to be overcome is constituted by the reaction provided by the means controlling the brake which is to be actuated.

Figs. 4 and 5 illustrate an embodiment of the system including the crankshaft and the axle of the steering wheels, which forms a modification of the corresponding system illustrated in Figs. 1 to 3. The trunnions of the crankshaft are constituted by the ends of a rectilinear shaft 56 held fast in the fixtures 17 and 19 bolted to the underside of the tractor chassis. Said shaft 56 extends freely through a broad and elongated port 57 formed in the axle 12 so as to not disturb in any case the lateral translational and oscillatory movements of the axle. In its central section the latter is held between two parallel plates 58 and is pivotally secured to a spindle 59 passing through it and the ends of which are secured to said plates 58, so as to form a crank for the shaft 56. The staying of the axle 12 is ensured by a V-shaped member 60 the arms of which are bolted through their ends to the corresponding ends of the axle and the apex of which is bolted to the crank arm 61 formed in a manner similar to the arm 58 and positioned adjacent the fixture 8. The arrangement controlling the brakes is constituted in the manner described hereinabove: Figs 4 and 5 illustrate in fact an arrangement for such a control which is similar to that illustrated in Fig. 2 and includes two flat arms 27 subjected to the action of the projection 25 so as to act selectively on the hydraulic means controlling the brakes of the corresponding driving wheels. An extension of the spindle 59 forms the projection 25 acting on the flat arms 27.

In the embodiments described hereinafter, the chassis of the tractor is not suspended elastically on the axle. The incorporation of the ancillary steering mechanism according to my invention does not require such a lack of suspension; as a matter of fact, it is applicable to an axle carrying steering wheels and connected with the chassis through springs.

Figs. 10 to 12 illustrate a preferred embodiment intended for such a case. 62 designates a web of a crossmember to which the longitudinal suspension springs 63 are secured in their middle by straps 64. Said crossmember is provided with two vertical flanges 65 between which is formed a space for the passage of the axle 12 carrying the steering wheels 9. At each end of said cross-member, is provided a longitudinal rod 66 extending through aligned openings formed in the lower sections of the flanges 65. Said rod is threaded at each end for engagement with locking nuts 67 and it serves as a suspension axis for the axle through which each rod passes inside an elongated and broad port 68 so as to allow the axle to move freely over said rods. Two shackles 69 connect each of said rods 66 with a pivotal spindle 70 fitted in an opening in the upper section of the axle. Said spindle plays the part of the crank section 21 in the first embodiment described, with the difference that the shackles at the two ends define a deformable parallel motion which allows a shifting of the axle only in parallelism with its own direction along a horizontal line. Its lateral oscillatory movement is allowed as a consequence of the difference between the bending sags of the suspension springs carrying the chassis. In its middle (Fig. 12) the axle 12 carries a pin 71 which plays the part of the control projection 25 in the first embodiment described. Said pin 71 is held between the two arms 27 clamped by the springs 30 against the two studs 72 and 73 secured to the adjacent vertical flange 65; said studs are vertically aligned with the pin 71 when the axle is in its mean position of equilibrium. The lower stud 72 serves as a pivotal axis for the two arms 27 while the upper stud 73 forms an abutment between their outer cooperating surfaces. The upper ends of the arms 27 are connected each with the piston of the corresponding master cylinder 33 of the hydraulic control cooperating with the brake associated with the corresponding driving wheel of the tractor. This arrangement is the same as that illustrated in Fig. 6; it is therefore unnecessary to describe it with any further detail and its operation is the same.

In the preceding examples, it has been assumed that the vehicle is provided with two angularly shiftable steering wheels carried by an axle adapted to assume freely a transverse movement. The auxiliary steering mechanism forming the object of the invention is also applicable to the case where the vehicle is provided with a single medial steering wheel.

Fig. 7 illustrates an embodiment corresponding to this last modification. The steering wheel 74 is fitted inside a strap 75 rigid with a vertical spindle 76 carrying a handle 77 on which the steering control means, which are not illustrated, are adapted to act. Said spindle 76 does not however form the king pin of the steering wheel and this king pin is constituted by a spindle 78 parallel with the spindle 76 and held inside a horizontal plate 79 forming part of the vehicle chassis which is not illustrated. Two flat levers 80 and 81 pass underneath and above said plate 79 and interconnect said spindles 76 and 78 extending through said levers. The upper flat lever or crank 81 extends beyond the spindle 78 up to a short distance from a vertical pin 82 secured to the plate 79 and it carries in its turn a vertical pin 83 lying in the same plane as said pin 82 and the spindles 76 and 78 when the steering wheel is not deflected. An arrangement similar to that illustrated in Fig. 6 provides for the control of the brakes cooperating with the driving wheels. It includes as precedingly two arms 27 which are urged elastically against each other by the springs 30 so as to engage the stationary king pin 78 which serves as a pivot therefor while said arms abut against the opposite sides of the stationary pin 82 when the pin 83 lies in the precedingly defined plane, the steering wheel not being deflected. To the arms 27 are secured the pistons of the master cylinders 33 forming part of the corresponding hydraulic control systems, the pipes feeding which are crossed so that the left hand arm may control the right hand driving wheel and reversely.

The operation of the mechanism is similar to that described precedingly; when the steering control means act on the crank 77 so as to deflect the steering wheel, the transverse reaction of the ground produces a rocking of the levers 80—81 round the king pin 78 in the direction provided for steering and consequently the pin 83 will act on the arm 27 located on the outside of the curve which has been initiated and on the master cylinder of the hydraulic control system located on the same side so as to brake the driving wheel on the inside of the turn which is being initiated, which provides for a cooperation of the driving wheels in the obtention of the steering effect. During rectilinear progression of the vehicle, the steering wheel is stabilized in its mean position through the elastic clamping of the arms 27 against the king pin 78 and against the abutment pin 82 whereby the pin 83 is held in the plane comprising said pin 82 and the king pin 78.

Obviously, the various embodiments illustrated and described have been given out solely by way of examples with a view to illustrating the means provided by my invention which covers all the equivalent embodiments within the scope of the accompanying claims. Thus, in the case of electrically controlled brakes, the transverse shifting of the member carrying the steering wheels may act through the agency of an electric switch on the circuits controlling the brakes corresponding selectively to the two driving wheels. Obviously also when the vehicle is provided with a hydraulic power unit feeding fluid under pressure, the master cylinders 33 may be replaced by one or two pressure distributors.

What I claim is:

1. In a self-propelling vehicle adapted to move over ground, the combination of two driving wheels, means including a differential controlling said driving wheels, a brake associated with each driving wheel, a chassis carried by the driving wheels, an axle member having steering wheel means pivotally mounted thereon, means controlling the angular deflection of the steering means with reference to the axle member, means including a pivotal connection between said axle member and the chassis and allowing the axle member to assume a transverse movement with reference to the chassis under the action of the lateral thrust exerted by the ground on the steering means upon angular deflection thereof and means whereby the transverse shifting of the axle member operates the brake cooperating with the driving wheel on the inside of the turn initiated by the angular deflection of the steering means.

2. In a self-propelling vehicle adapted to move over ground, the combination of two driving wheels, means including a differential controlling said driving wheels, a brake associated with each driving wheel, a chassis carried by the driving wheels, a crankshaft revolubly carried by the chassis to revolve round an axis extending longitudinally of the chassis and including an eccentric crank section, an axle member having steering wheels pivotally mounted thereon, means controlling the angular deflection of said steering wheels with reference to said axle member, means revolubly carried by said crank section and rigid with the axle member whereby the thrust of the ground on the steering wheels when angularly deflected constrains the axle member to rock round said crank section while assuming a transverse shifting movement, a control member moving with the crank section round the axis of the crankshaft, and means controlled by said control member controlling selectively the brake associated with the driving wheel on the inside of the turn initiated by the angular deflection of the steering wheels.

3. In a self-propelling vehicle adapted to move over ground, the combination of two driving wheels, means including a differential controlling said driving wheels, a brake associated with each driving wheel, a chassis carried by the driving wheels, a crankshaft revolubly carried by the chassis to revolve round an axis extending longitudinally of the chassis and including an eccentric crank section, an axle member having steering wheels pivotally mounted thereon, means controlling the angular deflection of said steering wheels with reference to said axle member, means revolubly carried by said crank section and rigid with the axle member whereby the thrust of the ground on the steering wheels when angularly deflected constrains the axle member to rock round said crank section while assuming a transverse shifting movement, a control member moving with the crank section round the axis of the crankshaft, two arms pivotally secured to the chassis round the axis of the crankshaft and adapted to move in a vertical transverse plane passing through last-mentioned control member, springs urging said arms towards each other into a position for which they extend vertically in close proximity with each other to either side of the crankshaft, a master cylinder controlling each of the brakes cooperating with the driving wheels and including each a piston rod pivotally connected with the corresponding pivoting arm and a control member held between said arms and controlled by the shifting of the axle member and crankshaft, the thrust exerted by the ground upon deflection of the steering wheels producing a transverse shifting of the axle member and thereby of the control member to constrain the latter to shift laterally the arm pivotally secured to the piston rod of the master cylinder controlling the brake for the driving wheel on the inside of the turn initiated by the deflection of the steering wheels.

4. In a self-propelling vehicle adapted to move over ground, the combination of two driving wheels, means including a differential controlling said driving wheels, a brake associated with each driving wheel, a chassis carried by the driving wheels, a crankshaft revolubly carried by the chassis to revolve round an axis extending longitudinally of the chassis and including an eccentric crank section, an axle member having steering wheels pivotally mounted thereon, means controlling the angular deflection of said steering wheels with reference to said axle member, means revolubly carried by said crank section and rigid with the axle member whereby the thrust of the ground on the steering wheels when angularly deflected constrains the axle member to rock round said crank section while assuming a transverse shifting movement, a control member moving with the crank section round the axis of the crankshaft, a system of levers carried by the chassis, elastic means urging said levers towards last-mentioned control member, and means interconnecting said levers with the brakes for the driving wheels and adapted upon a thrust exerted in a given direction by the shifting of the axle member in a corresponding direction to operate the brake on that wheel which is on the inside of the turn initiated by the deflection of the steering wheels.

5. In a self-propelling vehicle adapted to move over ground, the combination of two driving wheels, means including a differential controlling said driving wheels, a brake associated with each driving wheel, a chassis carried by the driving wheels, a crankshaft revolubly carried by the chassis to revolve round an axis extending longitudinally of the chassis and including an eccentric crank section, an axle member having steering wheels pivotally mounted thereon, means controlling the angular deflection of said steering wheels with reference to said axle member, means revolubly carried by said crank section and rigid with the axle member whereby the thrust of the ground on the steering wheels when angularly deflected constrains the axle member to rock round said crank section while assuming a transverse shifting movement, a control member moving with the crank section round the axis of the crankshaft, two arms pivotally secured to the chassis round the axis of the crankshaft and adapted to move in a vertical transverse plane passing through last-mentioned control member, springs urging said arms towards each other into a position for which they extend vertically in close proximity with each other to either side of the crankshaft, a cable operatively connected with each arm and controlling the brake for the corresponding driving wheel and a control member held between said arms and controlled by the shifting of the axle member and crankshaft, the thrust exerted by the ground upon deflection of the steering wheels producing a transverse shifting of the axle member and thereby of the control member to constrain the latter to shift into operation selectively the arm connected with the cable adapted to actuate the driving wheel located on the inside of the turn initiated by the deflection of the steering wheels.

6. In a self-propelling vehicle adapted to move over ground, the combination of two driving wheels, means including a differential controlling said driving wheels, a brake associated with each driving wheel, a chassis carried by the driving wheels, a crankshaft revolubly carried by the chassis to revolve around an axis extending longitudinally of the chassis and including an eccentric crank section, an axle member having steering wheels pivotally mounted thereon, means controlling the angular deflection of said steering wheels with reference to said axle member, means revolubly carried by said crank section and rigid with the axle member whereby the thrust of the ground on the steering wheels when angularly deflected constrains the axle member to rock round said crank section while assuming a transverse shifting movement, a control member moving with the crank section round the axis of the crankshaft, a system of levers carried by the chassis, elastic means urging said levers towards last-mentioned control member, means interconnecting said levers with the brakes for the driving wheels and adapted upon a thrust exerted in a given direction by the shifting of the axle member in a corresponding direction to operate the brake on that wheel which is on the inside of the turn initiated by the deflection of the steering wheels, and means for locking said control member moving in unison with the crank section in its neutral position lying in a vertical plane passing through the axis of the crankshaft.

7. In a self-propelling vehicle adapted to move over ground, the combination of two driving wheels, means including a differential controlling said driving wheels, a brake associated with each driving wheel, a chassis carried by the driving wheels, a crankshaft revolubly carried by the chassis to revolve round an axis extending longitudinally of the chassis and including an eccentric crank section, an axle member having steering wheels pivotally mounted thereon, means controlling the angular deflection of said steering wheels with reference to said axle member, means revolubly carried by said crank section and rigid wtih the axle member whereby the thrust of the ground on the steering wheels when angularly deflected constrains the axle member to rock round said crank section while assuming a transverse shifting movement, a control member moving with the crank section round the axis of the crankshaft, two arms pivotally secured to the chassis round the axis of the crankshaft and adapted to move in a vertical transverse plane passing through last-mentioned control member, springs urging said arms towards each other into a position for which they extend vertically in close proximity wtih each other to either side of the crankshaft, a master cylinder controlling each of the brakes cooperating with the driving wheels and including each a piston rod pivotally connected with the corresponding pivoting arm and a control member held between said arms and controlled by the shifting of the axle member and crankshaft, the thrust exerted by the ground upon deflection of the steering wheels producing a transverse shifting of the axle member and thereby of the control member to constrain the latter to shift laterally the arm pivotally secured to the piston rod of the master cylinder controlling the brake for the driving wheel on the inside of the turn initiated by the deflection of the steering wheels, means for locking said control member moving in unison with the crank section in its neutral position lying in a vertical plane passing through the axis of the crankshaft, last-mentioned means including a cable controlling the arms to hold them positively in said vertical position, and means within reach of the driver controlling said cable.

8. In a self-propelling vehicle adapted to move over ground, the combination of two driving wheels, means including a differential controlling said driving wheels, a brake associated with each driving wheel, a chassis carried by the driving wheels, a crankshaft revolubly carried by the chassis to revolve round an axis extending longitudinally of the chassis and including an eccentric crank section, an axle member having steering wheels pivotally mounted thereon, means controlling the angular deflection of said steering wheels with reference to said axle member, means revolubly carried by said crank section and rigid with the axle member whereby the thrust of the ground on the steering wheels when angularly deflected constrains the axle member to rock round said crank section while assuming a transverse shifting movement, an arm pivotally secured to the chassis, a member controlled by the rotation of the crank section driving said arm and cables secured to said pivoting arm and controlling the brakes of the driving wheels selectively according to the direction of steering and, consequently, of the shifting of the crank section.

9. In a self-propelling vehicle adapted to move over ground, the combination of two driving wheels, means including a differential controlling said driving wheels, a brake associated with each driving wheel, a chassis carried by the driving wheels, a crankshaft revolubly carried by the chassis to revolve round an axis extending longitudinally of the chassis and including an eccentric crank section, an axle member having steering wheels pivotally mounted thereon, means controlling the angular deflection of said steering wheels with reference to said axle member, means revolubly carried by said crank section and rigid with the axle member whereby the thrust of the ground on the steering wheels when angularly deflected constrains the axle member to rock round said crank section while assuming a transverse shifting movement, an arm pivotally secured to the chassis, a member controlled by the rotation of the crank section driving said arm and cables secured to said pivoting arm and controlling the brakes of the driving wheels selectively according to the direction of steering and, consequently, of the shifting of the crank section, a cam rigid with the pivoting arm, a lever pivoting with reference to the chassis in a transverse vertical plane, a cam follower carried by the lever and engaging the periphery of the cam and a spring urging the cam follower on the lever into engagement with the cam, the cam being provided with a medial depression into which the cam follower is urged by the spring to ensure stability of the position of the pivoting arm and thereby of the axle member in its medial position, until a sufficiently large thrust exerted by the ground on the steering wheels urges the cam follower out of said depression.

10. In a self-propelling vehicle adapted to move over ground, the combination of two driving wheels, means including a differential controlling said driving wheels, a brake associated with each driving wheel, a chassis carried by the driving wheels, said chassis including a cross-member, a suspended body and suspension springs interconnecting said body with said cross-member, an axle member having steering wheels pivotally mounted thereon, parallel connecting rods pivotally secured to said cross-member adapted to rock in transverse vertical planes round common axes, and to the outer ends of which the axle member is pivotally secured to assume a transverse shifting under the action of the thrust exerted by the ground on the steering wheels upon deflection of the latter, and means carried by the cross-member and adapted to be shifted by the transverse movements of the axle member in either direction and to control the brake cooperating with driving wheels on the inside of the turn initiated by the deflection of the steering wheels.

11. In a self-propelling vehicle adapted to move over ground, the combination of two driving wheels, means including a differential controlling said driving wheels, a brake associated with each driving wheel, a chassis carried by the driving wheels, a strap, a single steering wheel pivotally secured to said strap, means connecting said strap with the chassis and allowing said strap to assume a pivotal movement in a transverse direction with reference to the chassis under the action of a lateral thrust exerted by the ground on the steering wheel upon angular deflection thereof, a crank rigid with said strap and pivotally mounted on the chassis, means controlled by the shifting of said strap under the action of the thrust exerted by the ground on the steering wheel upon deflection thereof and adapted to control the brake cooperating with the driving wheel on the inside of the curve initiated by the deflection of the steering wheel.

12. In a self-propelling vehicle adapted to move over ground, the combination of two driving wheels, means including a differential controlling said driving wheels, a brake associated with each driving wheel, a chassis carried by the driving wheels, a steering wheel, two supports rigid with the underside of the chassis, a crankshaft including terminal coaxial trunnions revolubly carried in said supports to revolve round a horizontal axis lying in the medial plane of symmetry of the chassis, a stud rigid with one of the supports in vertical registry with and above the location of the corresponding trunnion, two spaced flat levers extending in two vertical planes parallel with the first-mentioned medial plane to either side of said stud and trunnion on said support and adapted to pivot round the axis of the crankshaft, springs urging said levers against said pin and stud, a member revolving with the crankshaft and engaging the space between the levers at a point between the corresponding trunnion and the stud and adapted to shift selectively said levers outwardly, means whereby the shifting of each lever away from the stud controls the brake for the corresponding driving wheel, and means whereby the shifting of the axle under the action of the thrust exerted by the ground on the steering wheel upon deflection thereof produces an angular shifting of the crankshaft and thereby constrains last-mentioned member to rock and to urge outwardly the lever controlling the brake for the wheel on the inside of the turn initiated by the deflection of the steering wheel.

13. In a self-propelling vehicle adapted to move over ground, the combination of two driving wheels, means including a differential controlling said driving wheels, a brake associated with each driving wheel, a chassis carried by the driving wheels, a pair of steering wheels, two supports rigid with the underside of the chassis, a crankshaft including terminal coaxial trunnions revolubly carried in said supports to revolve round a horizontal axis lying in the medial plane of symmetry of the chassis, a stud rigid with the front support in vertical registry with and above the location of the corresponding trunnion, two spaced flat levers extending in two vertical planes parallel with the first-mentioned medial plane to either side of said stud and trunnion on said support and adapted to pivot round the axis of the crankshaft, springs urging said levers against said pin and stud, a member revolving with the crankshaft and engaging the space between the levers at a point between the corresponding trunnion and the stud and adapted to shift selectively said levers outwardly, means whereby the shifting of each lever away from the stud controls the brake for the corresponding driving wheel, and means whereby the shifting of the axle under the action of the thrust exerted by the ground on the steering wheels upon deflection thereof produces an angular shifting of the crankshaft and thereby constrains last-mentioned member to rock and to urge outwardly the lever controlling the brake for the wheel on the inside of the turn initiated by the deflection of the steering wheels, a sheathed cable rigid with one lever and passing through the other lever, a sheath for said cable secured to the second lever, a stationary abutment on the outer end of said sheath and means for locking the outer end of the cable against movement to hold both levers in their stud engaging position and thereby lock the crank section of the crankshaft in said medial plane.

References Cited in the file of this patent
UNITED STATES PATENTS
2,031,317  Johnston _____ Feb. 18, 1936